No. 868,337. PATENTED OCT. 15, 1907.
E. H. GEIST.
COMBINED STEERING AND BRAKING DEVICE FOR MOTOR CARS.
APPLICATION FILED FEB. 26, 1907.
2 SHEETS—SHEET 1.
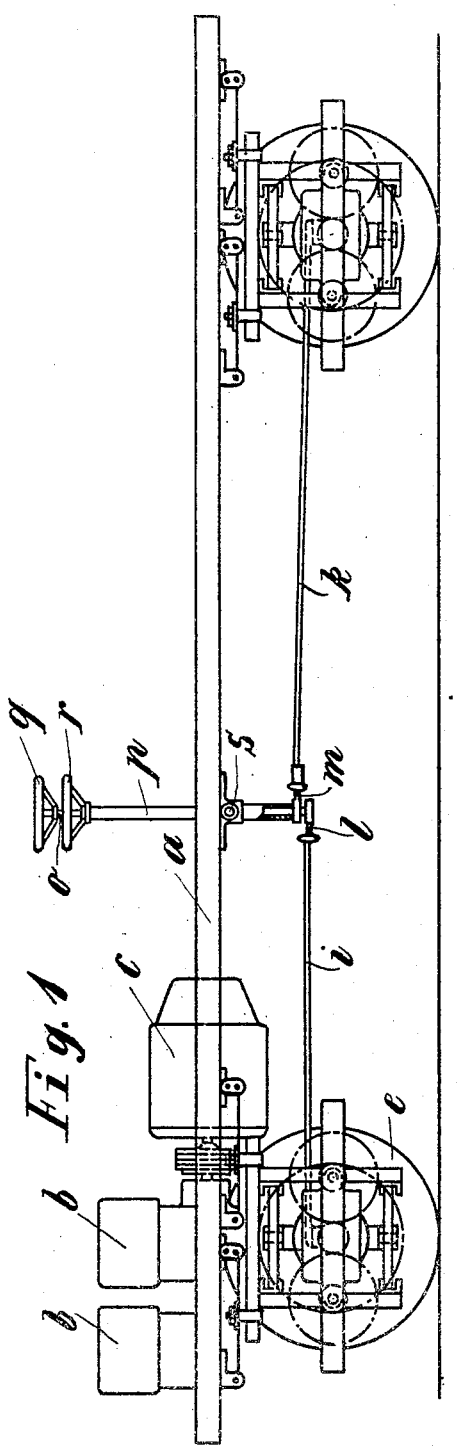
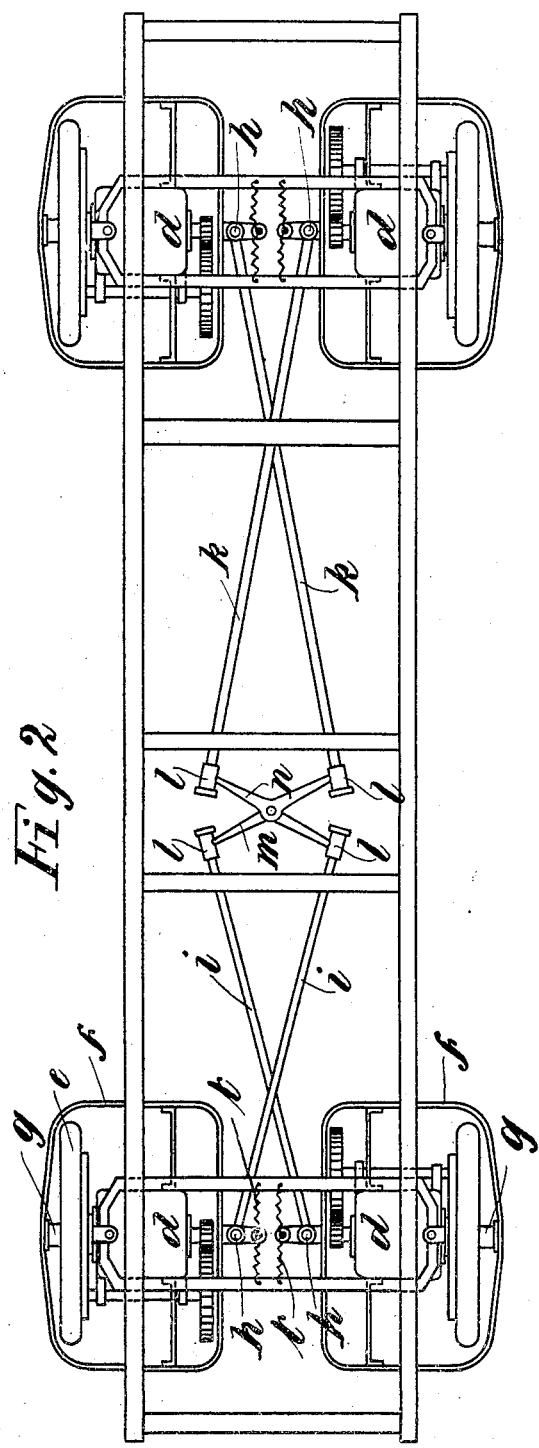

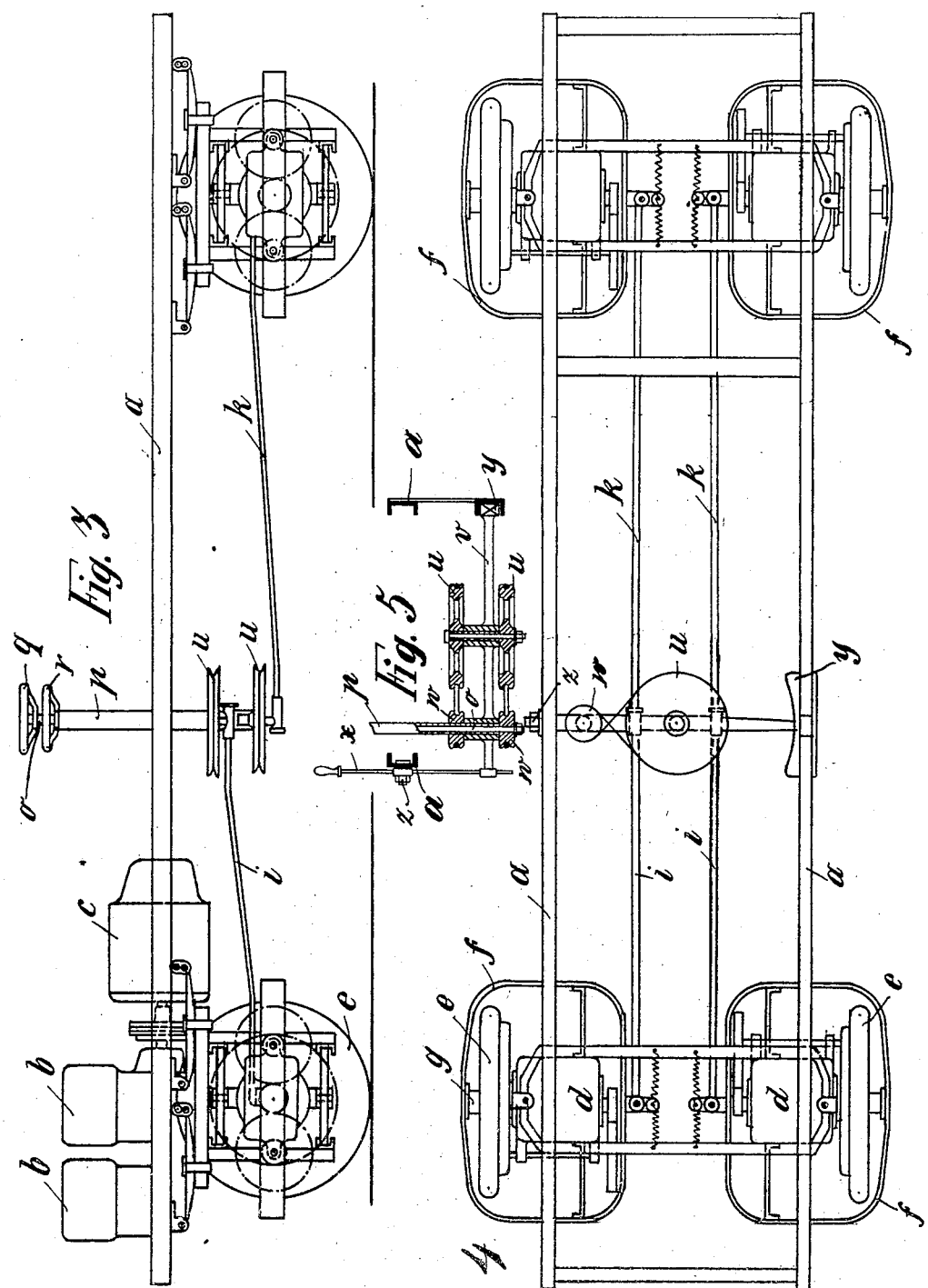

UNITED STATES PATENT OFFICE.

ERNST HEINRICH GEIST, OF COLOGNE, GERMANY.

COMBINED STEERING AND BRAKING DEVICE FOR MOTOR-CARS.

No. 868,337.  Specification of Letters Patent.  Patented Oct. 15, 1907.

Application filed February 26, 1907. Serial No. 359,438.

*To all whom it may concern:*

Be it known that I, ERNST HEINRICH GEIST, a subject of the King of Prussia, German Emperor, residing at Cologne, in the Province of the Rhine, Kingdom of Prussia, German Empire, have invented certain new and useful Combined Steering and Braking Devices for Motor-Cars, of which the following is a specification.

The present invention relates to a combined mechanism for motor cars with four wheels, by aid of which either the fore or the hind wheels alone, or also the fore and hind wheels simultaneously, can be steered and by aid whereof the car can also be braked, when the wheels of each pair of wheels are so adjusted as to converge.

The invention is illustrated in the drawing.

Figure 1 shows a side elevation of the car with the mechanism in place. Fig. 2 shows the corresponding plan view. Figs. 3 to 5 illustrate a modification adapted to effect the same result, as follows: Fig. 3 in elevation, Fig. 4 in plan, Fig. 5 in section on the line A—B.

Upon the chassis $a$ of the car, the gas engines $b$ are secured in the well known manner and are coupled direct to a dynamo $c$. This dynamo operates the electromotors $d$, which in turn actuates the wheels $e$ by means of gearing. The driving mechanism of each wheel as well as the wheel itself are inclosed in the fixed frame $f$ which is so secured outwardly upon the wheel hub $g$ that no parts of the axle project above the frame. In this manner all the wheels, together with their driving devices, are mounted quite concordantly, so that they can be exchanged one for another without any further adjustment. Upon the inside of the four frames $f$ are arranged the four projecting pivot bearings $h$ to which the four drawbars $i, i, k, k$ attach, the bars $i\ i$ connecting with the front wheels, and those $k\ k$ with the rear wheels. By moving these bars the wheels can be brought at will either into the steering or the braking position. In the arrangement illustrated in Figs. 1 and 2, the bars $i\ i$ and $k\ k$ are crossed and have at their other ends ball joint bearings $l$. In these bearings the angle levers $m, n$ provided at their ends with balls pivots, engage, which levers both turn on the same axle: the lever $m$ on the shaft $o$, the lever $n$ on the hollow shaft $p$, which surrounds the shaft $o$. Both shafts have at their upper end each a steering wheel respectively $q$ and $r$ and are moreover supported oscillatably on a pivot $s$ in the longitudinal axis of the car.

The pivotal connection of the sleeve surrounding as a guide the steering shafts offers a great advantage. The steering shafts which can be turned by the hand wheels thereby displacing at will the wheels of the car for turning or sidewise motion, can also be used as a lever in pushing the hand wheels bodily forward or backward, and thereby bringing the bell crank levers at the lower ends of the shafts out of the vertical line. If for instance the upper end of the steering shafts is drawn backward and the bell crank levers below the platform of the car go consequently forward, it will be seen that the front wheels of the car will be thrown out of parallel, the left side wheel will be steered towards the left and the right hand wheel towards the right. Also the rear wheels will be thrown out of parallel, the right side wheel to the right and the left side wheel to the left. It is evident that the tread of the wheels will produce on the ground a great amount of friction and a strong braking action will occur. The more the frame with the wheels are turned out of parallel in the described manner the stronger a sliding effect on the ground will occur. If the wheels could be turned at about 90° so that the front wheels are in one plane at right angles to the length of the vehicle, obviously the wheels would not run and would simply slide crosswise on the ground, the rear wheels the same so that the vehicle must necessarily stop at the shortest distance.

The operation of the mechanism above described is as follows. When it is desired to steer the car, the operator turns either the steering wheel $q$, whereby the front wheels are steered, or the steering wheel $r$, whereby the rear wheels are steered. Further at sharp bends the front and the rear wheels can be moved simultaneously by turning both steering wheels at the same time. By the corresponding turning of both steering wheels moreover, the front and the rear wheels may be so adjusted that all four wheels remain parallel to one another, whereby it becomes possible to guide the car in a sidewise slanting direction. During this operation the longitudinal axis of the car remains parallel to itself.

In order by aid of this device to produce a braking action upon the car by turning the wheels of a pair of wheels towards one another, it is only necessary to swing the steering shafts $o$ and $p$ forward or backward around the support $s$. Hereby the rods $i\ i$, $k\ k$ are so moved that the desired action takes place.

In order to hold the wheels as surely as possible in their proper position during the straight running of the car, there are also provided on the projections $h$ the powerful springs $t$ acting in two directions, which springs engage with their other ends to the chassis and tend to hold the wheels consequently in the middle position. At the same time the springs also act favorably, inasmuch as they diminish the jerks in consequence of the unevenness of the track.

In electrical motor cars it frequently appears desirable to group the controlling device as much as possible around the steering shaft. If this construction be adopted in this instance it would cause difficulty in connection with an oscillatable shaft. In order to avoid this, the device can be constructed in the manner shown in Figs. 3 to 5 with the same effect, in the following manner.

The bars $i\ i$, $k\ k$ engage uncrossed by aid of ball joints in the two disks $u\ u$, which disks are both pivoted one above another to a horizontally oscillatable lever $v$ (Fig. 5). This lever $v$ is revoluble about the common axis of the steering shafts $o$ and $p$, which are firmly secured to the chassis near the disks $u$. The connecting of the disks $u\ u$ with the two steering shafts $o$ and $p$ is effected by means of two disks $w\ w$ placed at the same height upon the steering shafts $o$ and $p$, which disks are placed in connection with the disks $u\ u$ by means of a cord or chain. In place of these there might also of course gear wheels be used. By means of a lever $x$ placed on the side of the chassis $a$, the horizontal lever $v$ can be turned about the axis of the steering shafts, whereby the other free end of the lever is guided in a sliding piece $y$ which is fixed to the chassis. The lever $x$ is guided at its lower end so as to slide in the lever $v$ and is revoluble about the fixed pivot $z$.

The mode of operation of this device is the same as that of the first described modification. The steering of the wheels is here effected by turning the shaft $o$ or $p$, or both, which shafts in turn transmit their motion to one or both of the disks $u$. In order to bring the wheels into the braking position, the steering shafts are in this instance not moved, but instead thereof the brake lever $x$, whereby the bars $i\ i$, $k\ k$ can be simultaneously moved either forwards or backwards. In both cases the wheels are placed in the braking position. In the case of this construction the braking can also be effected without needing to bring the steering shafts out of their vertical position so that the controller can be arranged in the usual manner upon the steering shaft.

Having now particularly described and ascertained the nature of our said invention and in what manner the same is to be performed, we declare that what we claim is.

1. In combined steering and braking devices for motor cars, wheels, each being revolubly secured in individual frames connected to the chassis by vertical pivots, means to turn the wheels with their frames at will in parallel positions at an angle to the line of motion of the car and into convergent positions substantially as described.

2. In combined steering and braking devices for motor cars wheels, each being revolubly secured in individual frames connected to the chassis by vertical pivots, an arm projecting from each frame, two bell crank levers being fulcrumed on a vertical line one above the other, rods connecting the ends of said bell crank levers with the arms projecting from the frames, two vertical steering shafts, one being solid and carrying the lower bell crank lever, the other being tube shaped, surrounding the solid shaft, and carrying the upper bell crank lever, hand-wheels in close proximity secured to the upper ends of said shafts, and a guiding sleeve for the shafts pivotally secured to the platform of the car substantially as described and for the purpose set forth.

3. In combined steering and braking devices for motor cars wheels, each being revolubly secured in individual frames connected to the chassis by vertical pivots, an arm projecting from each frame, balance springs connecting the arm with rigid parts of the car, two bell crank levers being fulcrumed on a vertical line one above the other, rods connecting the ends of said bell crank levers with the arms projecting from the frame, two vertical steering shafts, one being solid and carrying the lower bell crank lever, the other being tube shaped, surrounding the solid shaft, and carrying the upper bell crank lever, hand-wheels in close proximity secured to the upper ends of said shafts, and a guiding sleeve for the shafts pivotally secured to the platform of the car substantially as described and for the purpose set forth.

In testimony whereof I have signed my name to this specification in the presence of two subscribing witnesses.

ERNST HEINRICH GEIST.

Witnesses:
 THOMAS R. WALLACE,
 LOUIS VANDORN.